United States Patent
Tsubota et al.

(10) Patent No.: US 11,554,967 B2
(45) Date of Patent: Jan. 17, 2023

(54) METHOD FOR PRODUCING POROUS METAL OXIDE

(71) Applicant: FUJIMI INCORPORATED, Kiyosu (JP)

(72) Inventors: Shogo Tsubota, Kiyosu (JP); Robert Hepburn, Tualatin, OR (US)

(73) Assignee: FUJIMI INCORPORATED, Kiyosu (JP)

( * ) Notice: Subject to any disclaimer, the term of this patent is extended or adjusted under 35 U.S.C. 154(b) by 869 days.

(21) Appl. No.: 16/071,214

(22) PCT Filed: Jan. 19, 2017

(86) PCT No.: PCT/JP2017/001729
§ 371 (c)(1),
(2) Date: Jul. 19, 2018

(87) PCT Pub. No.: WO2017/126602
PCT Pub. Date: Jul. 27, 2017

(65) Prior Publication Data
US 2021/0139342 A1    May 13, 2021

Related U.S. Application Data

(60) Provisional application No. 62/281,361, filed on Jan. 21, 2016, provisional application No. 62/338,756, filed on May 19, 2016.

(51) Int. Cl.
*C01G 25/02* (2006.01)
*C01F 7/36* (2006.01)

(52) U.S. Cl.
CPC .............. *C01G 25/02* (2013.01); *C01F 7/36* (2013.01); *C01P 2006/12* (2013.01); *C01P 2006/14* (2013.01); *C01P 2006/16* (2013.01)

(58) Field of Classification Search
CPC ........ C01G 25/02; C01F 7/36; C01P 2006/12; C01P 2006/14; C01P 2006/16
See application file for complete search history.

(56) References Cited

U.S. PATENT DOCUMENTS

| | | | |
|---|---|---|---|
| 3,394,990 A | 7/1968 | Weingaertner et al. | |
| 3,419,352 A | 12/1968 | Acciarri et al. | |
| 3,987,155 A * | 10/1976 | Ziegenhain | B01J 35/10 423/628 |
| 4,175,118 A * | 11/1979 | Wassermann | B01J 20/08 423/628 |
| 4,543,341 A | 9/1985 | Barringer et al. | |
| 6,444,608 B1 | 9/2002 | Oki et al. | |
| 2010/0254890 A1 | 10/2010 | Yang et al. | |
| 2011/0003085 A1 | 1/2011 | Hugener-Campbell et al. | |
| 2012/0122671 A1* | 5/2012 | Polli | B01J 23/38 502/263 |

FOREIGN PATENT DOCUMENTS

| | | |
|---|---|---|
| JP | S52-075698 A | 6/1977 |
| JP | H10-324580 A | 12/1998 |
| JP | 2002-320850 A | 11/2002 |
| JP | 2007-522066 A | 8/2007 |
| JP | 2013-522164 A | 6/2013 |
| JP | 2013-129574 A | 7/2013 |
| JP | 2014-500217 A | 1/2014 |
| WO | WO-2005/072870 A1 | 8/2005 |
| WO | WO-2007/021037 A1 | 2/2007 |
| WO | WO-2010/114561 A1 | 10/2010 |
| WO | WO-2011/119638 A2 | 9/2011 |
| WO | WO-2012/067655 A1 | 5/2012 |

OTHER PUBLICATIONS

Extended European Search Report issued In corresponding European Application No. 17741479.4 dated Nov. 6, 2019.
Chakravarty et al., "Mesoporous Alumina (MA) Based Double Column Approach for Development of a Clinical Scale $^{99}Mo/^{99m}Tc$ Generator Using $(n,\gamma)^{99}Mo$: An Enticing Application of Nanomaterial," Industrial & Engineering Chemistry Research, vol. 52, 2013, pp. 11673-11684.

* cited by examiner

*Primary Examiner* — Yong L Chu
(74) *Attorney, Agent, or Firm* — Foley & Lardner LLP

(57) ABSTRACT

Provided is a method for producing a porous metal oxide. The method includes: preparing a slurry by mixing a metal source, a pore forming agent and an aqueous solvent; drying the slurry to obtain a metal oxide precursor; and sintering the metal oxide precursor to generate a porous metal oxide. The metal source is an organometallic compound or hydrolyzate thereof containing a metal that makes up the porous metal oxide; the pore forming agent is an inorganic compound that generates a gas by decomposing at a temperature equal to or lower than a temperature at which the metal oxide precursor is sintered; and the slurry is prepared using 50 parts by weight or more of the pore forming agent with respect to 100 parts by weight of the metal source.

15 Claims, 4 Drawing Sheets

20nm

20nm

METHOD FOR PRODUCING POROUS METAL OXIDE

CROSS-REFERENCE TO RELATED APPLICATIONS

This application is a National Phase Application of International Patent Application No. PCT/JP2017/001729, filed Jan. 29, 2017, which claims the benefit of and priority to U.S. Provisional Patent Application No. 62/281,361, filed Jan. 21, 2016, and U.S. Provisional Patent Application No. 62/338,756, filed on May 19, 2016, the entire disclosures of which are incorporated by reference herein.

TECHNICAL FIELD

The present invention relates to a method for producing a porous metal oxide.

BACKGROUND ART

Porous metal oxides such as porous alumina and porous zirconia are widely used for instance as catalyst carriers and adsorbents. Technical literature relating to porous alumina and the production thereof include Patent Literature 1 to 3. Technical literature relating to the advantages, as catalyst carriers, of metal oxides having a mesoporous structure, includes Patent Literature 4.

Examples of the uses of porous metal oxides include Mo adsorbents in technetium 99m ($^{99m}$Tc) generators. Herein $^{99m}$Tc generators are devices in which molybdenum 99 ($^{99}$Mo), as a parent nuclide, is caused to be adsorbed in a column packed with a Mo adsorbent, such that $^{99m}$Tc generated from $^{99}$Mo can be eluted by washing physiological saline through the column. The $^{99m}$Tc retrieved through elution is allowed to bond with an appropriate drug, to be then used for instance in nuclear medical diagnosis in the form of a so-called radiopharmaceutical (technetium preparation).

Examples of porous metal oxides that can be preferably used as Mo adsorbents in $^{99m}$Tc generators include for instance porous alumina. Non Patent Literature 1 is an example of a technical literature pertaining to porous alumina for Mo adsorbents in $^{99m}$Tc generators. Non Patent Literature 1 discloses the feature of producing porous alumina using glucose as a template for pore formation.

Other examples of applications of porous metal oxides include for instance uses as catalyst carriers. For instance, three-way catalysts containing a catalyst component in the form of a metal such as platinum are widely used, typically supported on catalyst carriers, in order to purify exhaust gas emitted by internal combustion engines such as automotive engines. For instance powders of metal oxides can be preferably used as the catalyst carrier. Catalyst carriers of porous structure can be advantageous in terms of contact efficiency between a catalyst component and a target component. Taking into consideration the durability of the catalyst carrier under actual usage environments, preferred examples of catalyst carriers include for instance porous metal oxides such as porous alumina and porous zirconia.

CITATION LIST

Patent Literature

Patent Literature 1: Japanese Patent Application Publication No. 2013-129574
Patent Literature 2: U.S. Pat. No. 4,175,118 (Specification)
Patent Literature 3: U.S. Patent Application Publication No. 2012/0122671 (Specification)
Patent Literature 4: Japanese Patent Application Publication No. 2002-320850

Non Patent Literature

Non Patent Literature 1: Industrial & Engineering Chemistry Research (Ind. Eng. Chem. Res.), Vol. 52, Pages 11673 to 11684 (2013)

SUMMARY OF INVENTION

Technical Problem

From the viewpoint of enhancing the performance of $^{99m}$Tc generators, Mo adsorbents are demanded that can hold (support) greater amounts of Mo. Although Patent Literature 1 to 3 disclose porous alumina for use in catalyst carriers and adsorbents, none of the above citations discloses the feature of using porous alumina as a Mo adsorbent in $^{99m}$Tc generators. The method for producing mesoporous alumina disclosed in Patent Literature 1 includes a step of preparing a slurry resulting from mixing an aqueous solution of an aluminum salt such as aluminum nitrate and an aqueous solution of ammonium carbonate, but this method is inconvenient in that the step of preparing the above slurry becomes readily destabilized, and for instance a homogeneous slurry fails to be obtained due to sudden gelling during the mixing process; alternatively, the method is inconvenient in terms of the numerous manufacturing restrictions incurred in order to suppress such gelling. Further, Patent Literature 2 proposes a method for producing a porous alumina product, the method including hydrolyzing an aluminum alcoholate in an aqueous solution that contains 8 to 20 wt % of a compound that splits out $NH_3$ and/or $CO_2$. However, the above compound is used in an amount of 0.5 to 3.0 parts by weight per 10 parts by weight of aluminum alcoholate, and is clearly different from the production method provided in the present specification. Patent Literature 3, which relates to a method for producing alumina that is suitable for use as a catalyst carrier for treatment of exhaust products from internal combustion engines, is a technology that gives preferential consideration to heat resistance requirements, and has thus low relevance to the invention disclosed herein. Patent Literature 4 as well does not disclose the feature of using a porous metal oxide as a Mo adsorbent in $^{99m}$Tc generators. Further, Patent Literature 4 discloses the feature of producing porous zirconia as a result of steps that involve dispersing hexadecyltrimethylammonium bromide in an aqueous solution of hydrochloric acid, further adding zirconium tetrapropoxide, mixing with an aqueous solution of ammonium sulfate prepared separately, and stirring, cooling, centrifugation and so forth. However such a production method is cumbersome and has room for improvement.

It is an object of the present invention, arrived at in the light of the above considerations, to provide a highly versatile production method for porous metal oxides that can be suitably used in various applications.

Solution to Problem

The method for producing a porous metal oxide provided in the present description includes preparing a slurry by mixing a metal source, a pore forming agent and an aqueous solvent. The method also includes drying the slurry to obtain a metal oxide precursor. Further, the method includes sintering the metal oxide precursor to generate a porous metal oxide. An organometallic compound or hydrolyzate thereof containing a metal that makes up the porous metal oxide is used as the above metal source. As the pore forming agent there is used an inorganic compound that generates a gas by decomposing at a temperature equal to or lower than a temperature at which the metal oxide precursor is sintered. To prepare the slurry there are used about 50 parts by weight or more of the pore forming agent with respect to 100 parts by weight of the metal source.

In the above production method an organometallic compound or a hydrolyzate thereof is used as a metal source, and therefore it becomes possible to prepare easily a slurry of good homogeneity. The slurry is prepared using about 50 parts by weight or more of a pore forming agent with respect to 100 parts by weight of the metal source. Therefore, a porous metal oxide having a structure suitable for various uses (for instance, Mo adsorbent, catalyst carrier and the like) can be generated accurately through drying and sintering of the slurry.

The technology disclosed herein can be preferably realized as an embodiment where the organometallic compound is a metal alkoxide. Metal isopropoxides are herein a preferred example of the metal alkoxide.

At least one type of compound selected from among ammonium salts, carbonate salts and bicarbonate salts can be used as the pore forming agent. Pores that are suitable for various applications (for instance Mo adsorption) tend to be formed with good efficiency by using such a pore forming agent.

In one preferred embodiment of the technology disclosed herein, the slurry can be prepared using from about 1 part by weight to about 50 parts by weight of the metal source (for instance a metal alkoxide) with respect to 100 parts by weight of the aqueous solvent. A slurry of good homogeneity tends to be prepared easily when adopting such an embodiment.

In another preferred embodiment of the technology disclosed herein the slurry can be prepared using from about 2 parts by weight to about 30 parts by weight of the pore forming agent with respect to 100 parts by weight of the aqueous solvent. A slurry of good homogeneity tends to be prepared easily when resorting to such an embodiment.

The metal oxide precursor is preferably sintered at a sintering temperature in the range of about 500° C. to about 700° C. As a result it becomes possible to efficiently obtain a porous metal oxide having a structure suitable for various applications.

In one embodiment of the technology disclosed herein sintering of the metal oxide precursor may include N sintering stages (where N is an integer equal to or greater than 2) from a first stage up to an N-th stage, in this order. Such an embodiment allows increasing the homogeneity of the porous metal oxide. From the viewpoint of achieving a more pronounced effect, a sintered product from an (n−1)-th stage (where n is an integer in the range of 2 to N), from among the N sintering stages, may be subjected to the next (i.e. the n-th) sintering stage after having been cooled down to a temperature lower than 300° C.

In one embodiment of the technology disclosed herein sintering of the metal oxide precursor may include a first sintering stage and a second sintering stage that are carried out at a temperature (for instance a sintering temperature in the range of about 500° C. to about 700° C.) equal to or higher than the temperature at which a gas is generated through decomposition of the pore forming agent. The sintered product from the first sintering stage may be subjected to the second sintering stage after having been cooled down to a temperature lower than 300° C. A porous metal oxide of yet better homogeneity can be provided thanks to such an embodiment.

In one embodiment of the technology disclosed herein a porous metal oxide having an average pore size of 9 nm or larger is generated through sintering of the metal oxide precursor. A porous metal oxide having such an average pore size can be preferably used in various applications such as Mo adsorbents and catalyst carriers.

In another embodiment of the technology disclosed herein a porous metal oxide having a pore volume of 0.3 cm$^3$/g or larger is generated through sintering of the metal oxide precursor. A porous metal oxide having such a pore volume can be preferably used in various applications such as Mo adsorbents and catalyst carriers.

In another embodiment of the technology disclosed herein a porous metal oxide having a specific surface area of 180 m$^2$/g or larger is generated through sintering of the metal oxide precursor. A porous metal oxide having such a specific surface area can be preferably used in various applications such as Mo adsorbents and catalyst carriers.

Non-limiting examples of the porous metal oxide in the technology disclosed herein include porous alumina and porous zirconia. Such porous metal oxides can be preferably used in various applications such as Mo adsorbents and catalyst carriers. One preferred example of the above porous alumina is porous alumina substantially made up of γ-alumina.

The present description provides also a method for producing a $^{99m}$Tc generator. The method involves producing a porous metal oxide in accordance with any one of the methods disclosed herein, and incorporating the porous metal oxide inside a shield of the $^{99m}$Tc generator. Such a method allows producing a high-performance $^{99m}$Tc generator by providing a porous metal oxide (for instance porous alumina) of good Mo adsorption performance.

DESCRIPTION OF EMBODIMENTS

Figure 1:
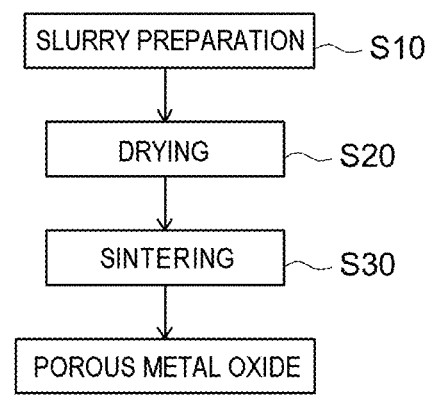
FIG. 1 is a flow diagram illustrating a method for producing a porous metal oxide according to the present invention.

Preferred embodiments of the present invention will be explained below on the basis of drawings. Any features other than the features specifically set forth in the present description and which may be necessary for carrying out the present invention can be regarded as instances of design matter for a person skilled in the art on the basis of known techniques in the technical field in question. The invention can be realized on the basis of the disclosure of the present description and common technical knowledge in the relevant technical field.

In the drawings, members and portions that elicit identical effects will be explained using identical reference symbols, and a recurrent explanation thereof will be omitted or simplified. The embodiments described in the figures have been schematized with a view to explaining the present invention in a clear manner, and do not necessarily represent accurately the size and scale of products actually provided.

The method for producing a porous metal oxide provided in the description can be preferably used to produce for instance porous alumina. Specifically, the description provides a porous alumina production method that includes: preparing a slurry by mixing an aluminum source (Al source), a pore forming agent and an aqueous solvent; drying the slurry to obtain an alumina precursor; and sintering the alumina precursor to generate porous alumina. The Al source is an organometallic compound (i.e. an organoaluminum compound) or hydrolyzate thereof that contains aluminum, being a metal that makes up the above porous alumina. The pore forming agent is an inorganic compound that generates a gas by decomposing at a temperature equal to or lower than the temperature at which the alumina precursor is sintered. The slurry is prepared using 50 parts by weight or more of the pore forming agent with respect to 100 parts by weight of the Al source.

The above porous alumina production method allows providing a porous metal oxide other than porous alumina, and a production method of the porous metal oxide, by using another metal source instead of an Al source, for instance by using another metal alkoxide. Therefore, the present description includes also a porous metal oxide (encompassing porous alumina and other porous metal oxides) and a production method thereof. Examples of porous metal oxides other than porous alumina include porous zirconia. Specifically, the description provides a porous zirconia production method that includes: preparing a slurry by mixing a zirconium source (Zr source), a pore forming agent and an aqueous solvent; drying the slurry to obtain a zirconia precursor; and sintering the zirconia precursor, to generate porous zirconia. The Zr source can be an organozirconium compound or a hydrolyzate thereof. The pore forming agent is an inorganic compound that generates a gas by decomposing at a temperature equal to or lower than the temperature at which the zirconia precursor is sintered. The slurry is prepared using 50 parts by weight or more of the pore forming agent with respect to 100 parts by weight of the Zr source. Further examples of porous metal oxides other than porous alumina include porous titania. The present description provides also a porous titania production method wherein a titanium source (for instance a titanium alkoxide) is used instead of the Al source in the above porous alumina production method.

One typical embodiment of the method for producing a porous metal oxide (for instance, porous alumina such as γ-alumina, or porous zirconia) disclosed herein will be explained next with reference to FIG. 1. Firstly there is prepared a slurry through mixing of a metal source, a pore forming agent and an aqueous solvent (step S10). Next, the slurry prepared in step S10 is dried to yield a metal oxide precursor (step S20). Then a porous metal oxide is generated (step S30) through sintering of the metal oxide precursor obtained in step S20. The details of the various steps, the materials used and so forth will be explained in detail below.

<Metal Source>

In the method for producing a porous metal oxide disclosed herein an organometallic compound or hydrolyzate thereof containing a metal corresponding to the targeted porous metal oxide is supplied as the metal source. The metal is not particularly limited so long as it can form a porous oxide. The metal can be a metal belonging to any one of groups 2 to 14 (typically groups 3 to 13) of the periodic table. The metal may be a typical metal element or a transition metal element. Concrete examples of the metal include aluminum, zirconium and the like. In the case for instance where the above method is used for producing porous alumina, an organoaluminum compound or hydrolyzate thereof can be preferably used as the metal source, while in the case where the above method is used for producing porous zirconia, an organozirconium compound or hydrolyzate thereof can be preferably used as the metal source. By using such metal sources it becomes possible to easily prepare a slurry of good homogeneity. Doing so is preferable from the viewpoint of productivity and quality stability in the porous metal oxide.

The term organoaluminum compound in the description refers to a compound that contains Al and an organic group. Therefore, non-limiting examples of the organoaluminum compound include, besides compounds such as alkyl aluminum having direct bonds with Al and carbon (C) of the organic group, also compounds having a structure in which C in the organic group is bonded to Al via another element. The organoaluminum compound can be used in the form of a single type alone, or as a combination of two or more types. The same applies to the organozirconium compound and other organometallic compounds.

In one embodiment of the technology disclosed herein a water insoluble compound can be preferably used as the above organoaluminum compound. Preferably, a nonionic organoaluminum compound can be used for instance from the viewpoint of ease of preparation of the slurry. The same applies to the organozirconium compound and other organometallic compounds.

The organometallic compound in the technology disclosed herein can be for instance a compound having a structure in which C in the organic group is bonded to the metal via oxygen (O). Typical examples of organometallic compounds having such a structure include metal alkoxides. The technology disclosed herein can be preferably implemented as an embodiment where a metal alkoxide is thus used as the organometallic compound. The step of preparing the above slurry in an embodiment where a metal alkoxide is used can be grasped as a step of hydrolyzing a metal alkoxide in an aqueous solvent containing a pore forming agent. The metal alkoxide may be used to prepare the slurry in an embodiment where at least part of the metal alkoxide is hydrolyzed.

The number of carbon atoms in the alkoxy group of the metal alkoxide is not particularly limited. The number of carbon atoms in the alkoxy group can range for instance from about 1 to 12. A metal alkoxide having 6 or fewer carbon atoms, and more preferably 5 or fewer carbon atoms, for instance 4 or fewer carbon atoms, in the alkoxy group can be preferably used as the organometallic compound in the technology disclosed herein. Preferably a metal alkoxide having two or more carbon atoms in the alkoxy group can be used herein from the viewpoint of handleability. Preferred examples of the metal alkoxide that can be used in the technology disclosed herein include for instance ethoxides, isopropoxides, sec-butoxides and tert-butoxides of the above metal.

In a case where the technology disclosed herein is used in porous alumina, preferred examples of the aluminum alkoxide that can be used for producing the porous alumina include aluminum ethoxide, aluminum isopropoxide, aluminum sec-butoxide and aluminum tert-butoxide. Aluminum isopropoxide is preferred among the foregoing. The technology disclosed herein can be preferably implemented as an embodiment where aluminum isopropoxide is used singly as the organoaluminum compound.

In a case where the technology disclosed herein is applied to porous zirconia, preferred examples of zirconium alkoxides that can be used for producing the porous zirconia include for instance zirconium ethoxide, zirconium isopropoxide, zirconium sec-butoxide and zirconium tert-butoxide. Preferred among the foregoing is zirconium isopropoxide. The technology disclosed herein can be preferably implemented as an embodiment where zirconium isopropoxide is used singly as the organozirconium compound. The same applies to metal alkoxides that can be used for producing other porous metal oxides (for instance, titanium alkoxides that can be used for producing porous titania).

<Pore Forming Agent>

In the method for producing a porous metal oxide disclosed herein there is prepared a slurry by mixing the above metal source, pore forming agent and aqueous solvent, and by drying and sintering the slurry, to yield a porous metal oxide. As the pore forming agent there is used an inorganic compound that generates gas through decomposition at a temperature equal to or lower than the temperature at which sintering is carried out. The pore forming agent can be used singly or in the form of a combination of two or more types. Although not meaning to be bound by theoretical constraints, the inventors find that the gas (for instance one of $CO_2$ and $NH_3$ or both of $CO_2$ and $NH_3$) that is generated from the pore forming agent in at least one process from among the above drying and sintering contributes effectively to form a porous structure that is appropriate for suitably bringing out various functions (for instance holding of a metal such as Mo as well as a catalyst carrier function). The above metal may be for instance aluminum or zirconium, but is not limited thereto.

A compound capable of generating a gas at a temperature of about 500° C. or lower, more preferably about 400° C. or lower, and typically about 300° C. or lower, can be preferably used as the pore forming agent. A compound that generates a gas at a temperature of about 200° C. or less, or about 100° C. or less, may be used as the pore forming agent. Preferably, a compound that generates a gas at a temperature of for instance about 30° C. or higher, more preferably about 40° C. or higher, and typically about 50° C. or higher, can be used as the pore forming agent. The technology disclosed herein can be preferably implemented as an embodiment where a compound that generates a gas at a temperature of about 40° C. to about 300° C. (for instance about 50° C. to about 150° C.) is used as the pore forming agent.

The pore forming agent is not particularly limited, and for instance ammonium salts, carbonate salts, bicarbonate salts and the like can be used as the pore forming agent. For instance compounds belonging to at least one from among ammonium salts and carbonate salts can be preferably used herein. Concrete examples of compounds that can be used as the pore forming agent include for instance ammonium carbonate, ammonium bicarbonate, ammonium carbamate, sodium bicarbonate and the like. In one embodiment there can be preferably used a pore forming agent that contains substantially no metal element other than a metal that makes up the target porous metal oxide, from the viewpoint of obtaining high-purity porous alumina by reducing the amount of residues in the pore forming agent. In another embodiment a water-soluble compound is preferably used as the pore forming agent, from the viewpoint of ease of preparation of the slurry.

The technology disclosed herein can be preferably implemented as an embodiment where at least ammonium carbonate is used as the pore forming agent. In a preferred embodiment for instance about 70% or more (more preferably about 85% or more and for instance about 95% or more), on a weight basis, of the pore forming agent that is used is ammonium carbonate. Herein substantially just ammonium carbonate may be used as the pore forming agent. The wording "substantially" is used to mean that no pore forming agent other than ammonium carbonate is used at least deliberately, while allowing for the presence of unavoidable impurities and/or modified products.

<Slurry Preparation>

The procedure for preparing the slurry in the method for producing a porous metal oxide disclosed herein is not particularly limited. In one embodiment, preparation procedure of mixing a metal source in an aqueous solvent containing a pore forming agent (for example, a pore forming agent aqueous solution). The above metal may be for instance aluminum or zirconium, but is not limited hereto.

In the present specification the term aqueous solvent encompasses conceptually water and a mixed solvent having water as a main component (typically the component of highest content on a weight basis). As the component other than water and that makes up the above mixed solvent there can be used one or two or more types of solvent uniformly miscible with water selected for instance from among lower alcohols (typically, monoalcohols having about 1 to 4 carbon atoms, for instance methanol, ethanol and the like) and lower ketones. The proportion of water in the aqueous solvent in the technology disclosed herein lies typically in the range of more than 50% to 100% on a weight basis.

In an embodiment that involves adding a metal source to an aqueous solvent containing a pore forming agent (typically a pore forming agent aqueous solution), the proportion of water in the aqueous solvent is typically 50% or higher, and ordinarily is suitably 70% or higher on a weight basis. The proportion of water may be 80% or higher, 90% or higher, 95% or higher, 99% or higher, and may be substantially 100%. The wording "substantially" is used to mean that there is used no solvent other than water at least deliberately. The technology disclosed herein can be implemented as an embodiment where for instance a metal source is added to an aqueous solution of a pore forming agent.

In embodiments where a metal source is added to an aqueous solvent containing a pore forming agent, the metal source may be added as-is, or may be added together with an appropriate solvent in a form where the metal source is for instance dissolved or dispersed in the solvent.

The technology disclosed herein can be preferably implemented as an embodiment where a metal source that is solid (without being dispersed in solvent) at normal temperature (for instance 25° C.), such as aluminum isopropoxide, is added to an aqueous solvent that contains the above pore forming agent. In this case the solid metal source is preferably added in the form of a powder. Although not particularly limited thereto, ordinarily the average particle size of the powder is appropriately about 300 μm or smaller, preferably about 100 μm or smaller, for instance from the viewpoint of slurry homogeneity and the dispersibility of the powder. The lower limit of the average particle size of the powder is not particularly restricted. In one embodiment the average particle size of the powder can be set to be for instance about 100 nm or larger, for instance from the viewpoint of powder handleability. The above average particle size can be resorted to also as the average particle size of the above powder in an embodiment where a powder of the metal source that is dispersed in a solvent is added.

Unless otherwise stated, the wording "average particle size" in the present specification denotes a particle size (50% volume average particle size; hereafter also notated as D50 for short) being a 50% cumulative value in a particle size distribution that is measured using a particle size distribution measuring device relying on laser diffraction scattering.

For instance water, a solvent that is uniformly miscible with water, as well as mixed solvents of the foregoing can be used in an embodiment where the metal source is added to an aqueous solvent containing a pore forming agent, in a form resulting from dissolving or dispersing the metal source in the solvent. Herein one or two or more types of solvent selected from among lower alcohols (typically a monoalcohol having about 1 to 4 carbon atoms, for instance methanol or ethanol) and lower ketones can be used as the above solvent that is uniformly miscible with water. Although not particularly limited thereto, the amount of solvent that is used for dissolving or dispersing the metal source can be set for instance to about 500 g or less, and may be set to about 300 g or less, or about 200 g or less, and further about 150 g or less, with respect to 100 g of the metal source. The amount of the solvent that is used with respect to 100 g of the metal source can be set for instance to about 10 g or more, and may be set to about 50 g or more, or about 80 g or more, and further about 100 g or more.

The proportion of water in the total aqueous solvent that is used for preparing the slurry through mixing of the metal source, the pore forming agent and the aqueous solvent ranges typically from more than 50% to 100%, and ordinarily lies preferably in the range of 70% to 100%, on a weight basis. The proportion of water may be 80% or higher, 90% or higher, 95% or higher, or 99% or higher. In one embodiment the proportion of water may be substantially 100%. Specifically, the aqueous solvent that is used in the preparation of the slurry may be just water. In another embodiment the proportion of water in the aqueous solvent that is used for preparing the slurry may be for instance lower than 95%, or lower than 90%. The technology disclosed herein can be implemented as an embodiment where the proportion of water in the aqueous solvent that is used for preparing the slurry lies for instance in the range of 80% to 100%.

The amount of the pore forming agent that is used for preparing the slurry is appropriately set to about 50 parts by weight or more, preferably to about 100 parts by weight or more, and more preferably to about 150 parts by weight or more, with respect to 100 parts by weight of the metal source. An increase in the amount of the pore forming agent with respect to the metal source tends to result in a greater amount of metal (for instance Mo, platinum group metals and other catalyst metals) that can be held per weight of porous metal oxide. In one embodiment the amount of the pore forming agent with respect to 100 parts by weight of the metal source may be set to about 200 parts by weight or more, and further to about 250 parts by weight or more. The upper limit of the amount of the pore forming agent is not particularly restricted, but ordinarily can be appropriately set to about 1000 parts by weight or less, preferably to about 500 parts by weight or less, and for instance to about 350 parts by weight or less, with respect to 100 parts by weight of the metal source.

The amount of aqueous solvent that is used in the preparation of the slurry can be set so that the amount of the pore forming agent with respect to 100 parts by weight of the aqueous solvent is about 30 parts by weight or less, preferably about 20 parts by weight or less, and more preferably about 10 parts by weight or less. Addition of a metal source to a liquid containing an aqueous solvent and a pore forming agent in such fractional amounts, with mixing of the whole, tends to translate into suitable preparation of a slurry that yields a porous metal oxide capable of efficiently holding a metal (for instance Mo, a catalyst metal or the like). The lower limit of the amount of the pore forming agent with respect to 100 parts by weight of the aqueous solvent is not particularly restricted, and ordinarily can be appropriately set to about 2 parts by weight or more, preferably about 4 parts by weight or more, and for instance about 5 parts by weight or more, with respect to 100 parts by weight of the aqueous solvent.

The amount of aqueous solvent that is used in the preparation of the slurry can be set so that the amount of the metal source with respect to 100 parts by weight of the aqueous solvent is about 50 parts by weight or less, preferably about 30 parts by weight or less, more preferably about 20 parts by weight or less, and for instance 10 parts by weight or less. Addition of a metal source to a liquid containing an aqueous solvent and a pore forming agent in such fractional amounts, with mixing of the whole, tends to translate into suitable preparation of a slurry that yields a porous metal oxide capable of efficiently holding a metal (for instance Mo, a catalyst metal or the like). A good stirring state can be preserved through suppression of gelling of the slurry, and the hydrolysis reaction of the metal alkoxide can be allowed to proceed more uniformly, in an embodiment where for instance a metal alkoxide is used as the metal source. A porous metal oxide boasting a structure of yet better homogeneity tends to be formed as a result. The lower limit of the amount of the metal source with respect to 100 parts by weight of the aqueous solvent is not particularly restricted, but ordinarily the amount of the metal source with respect to 100 parts by weight of water is appropriately set to about 1 part by weight or more, preferably about 2 parts by weight or more and for example about 3 parts by weight or more, for instance from the viewpoint of drying efficiency of the slurry.

The duration of mixing of the metal source, the pore forming agent and the aqueous solvent (typically, the mixing time after addition of the metal source to the aqueous solvent containing the pore forming agent) is not particularly limited, and can be set so that there is prepared a slurry that yields a suitable porous metal oxide, for instance depending on the type of the metal source that is used. Ordinarily, the mixing time may be appropriately set to about 1 or more hours, and is preferably 3 or more hours, or 6 or more hours, and for instance 12 or more hours, from the viewpoint of slurry homogeneity. In an embodiment where a metal alkoxide (for instance a metal isopropoxide) is added in powdery form, as the metal source, the above mixing time is appropriately set to about 12 or more hours, and is preferably about 24 or more hours. On the other hand the mixing time is ordinarily set to 72 or fewer hours, preferably 48 or fewer hours and more preferably 36 or fewer hours, from the viewpoint of productivity.

Although not particularly limited thereto, the slurry can be prepared at a temperature for instance lower than about 60° C., or lower than about 50° C., or lower than about 40° C. (for instance lower than about 35° C.). A slurry of yet higher homogeneity can be prepared stably at the above temperatures. Ordinarily, the slurry is appropriately prepared at a temperature of about 10° C. or higher, preferably at a temperature of about 15° C. or higher, from the viewpoint of productivity. The slurry preparation temperature described above can be preferably adopted in an embodiment where a metal alkoxide (for instance a metal isopropoxide) is used as the metal source.

<Drying of the Slurry>

The method for producing a porous metal oxide disclosed herein typically includes a step of obtaining a metal oxide precursor through drying of the above slurry. The above metal may be for instance aluminum or zirconium, but is not limited thereto. In an embodiment where a metal alkoxide (for instance a metal isopropoxide) is used as the metal source, the aqueous solvent that is used for preparing the slurry, and also the alcohol generated from the metal alkoxide, are removed through volatilization by drying.

The method disclosed herein can be preferably realized in an embodiment where no additional organic solvent is used in the process of obtaining the metal oxide precursor from the slurry. For instance the method disclosed herein can be realized without carrying out an operation of washing the solids contained in the slurry by using an organic solvent, or an operation of extracting components contained in the slurry using an organic solvent. This is preferable from the viewpoint of mitigating environmental impact.

The method disclosed herein can be preferably implemented as an embodiment where the process of obtaining the metal oxide precursor from the slurry does not include an operation of separating (sorting) the solids contained in the slurry from the solvent by filtering, centrifugation or the like, or an operation of washing the solids (in particular washing using a solvent capable of dissolving the pore forming agent). As a result it becomes possible to bring out effectively the function of the pore forming agent at the time of sintering of the metal oxide precursor. Doing away with the need for separation or washing of solids can be advantageous for instance from the viewpoint of streamlining production equipment, mitigating environmental impact thanks to a reduction in liquid waste, and enhancing productivity.

The drying temperature of the slurry is not particularly limited. In one embodiment drying of the slurry can be carried out at room temperature (typically, at about 15° C. or above, for instance at about 20° C. or above, and typically at less than about 40° C., preferably about 35° C. or below and for instance about 30° C. or below). The drying temperature of the slurry may be set to about 40° C. or higher (preferably about 60° C. or higher and more preferably about 70° C. or higher) in terms of promoting drying. The drying temperature can be set for instance to be about 150° C. or lower, and ordinarily is appropriately set to about 100° C. or lower, and is preferably about 95° C. or lower, for instance about 90° C. or lower, from the viewpoint of obtaining a more homogeneous metal oxide precursor. The drying time of the slurry is not particularly limited, and can be set so that there is obtained an appropriate dry state. Ordinarily the drying time is appropriately set to 120 or fewer hours (for instance 72 or fewer hours) from the viewpoint of productivity.

<Sintering of the Slurry>

In the method disclosed herein a porous metal oxide is obtained through sintering of the above metal oxide precursor. The sintered porous metal oxide is crushed as needed, and thereafter can be adjusted to an appropriate particle size in accordance with known method such as sieving.

The sintering conditions of the metal oxide precursor are not particularly limited, and can be set so that there is obtained a porous metal oxide having desired characteristics. For instance there may be carried out just single-stage sintering (once) alone, or N sintering stages (N times), being two or more stages, in order to obtain a porous metal oxide of desired characteristics. Sintering of the metal oxide precursor may thus include N stages (where N is an integer equal to or greater than 2) from a first stage up to an N-th stage, in this order.

The sintering temperature of the metal oxide precursor can be set for instance to about 150° C. or higher, and ordinarily may be appropriately set to be about 250° C. or higher, preferably about 300° C. or higher, or about 350° C. or higher, and may be set to about 400° C. or higher. The sintering temperature can be set for instance to be about 1200° C. or lower, and ordinarily is appropriately about 1000° C. or lower, and preferably about 800° C. or lower. In one embodiment of the technology disclosed herein the above sintering can be carried out at a temperature in the range of about 300° C. to about 1000° C. (for instance, about 400° C. to 800° C.).

The sintering time is not particularly limited, and can be set so that there is generated a porous metal oxide having desired properties. Ordinarily, the sintering time is appropriately set to be 1 or more hours, and may be set to 2 or more hours, or 3 or more hours, or for instance 5 or more hours. Ordinarily, the sintering time is appropriately set to 72 or fewer hours, preferably 48 or fewer hours and more preferably 50 or fewer hours, from the viewpoint of productivity. The term sintering time refers herein to the time during which a sintered object is kept at the sintering temperature, and in an embodiment where there are carried out two or more sintering stages, as described below, denotes the total time at which the sintered object is kept at the sintering temperature in respective sintering stages.

The sintering temperature and sintering time can be adopted as sintering conditions in the production of for instance porous alumina, porous zirconia and other porous metal oxides.

In the production of the porous alumina it is preferable to perform sintering in such a manner that γ-alumina (also referred to as activated alumina) is generated as the above porous alumina, since in that case the held amount of metal (for instance Mo, catalyst metal and the like) per weight of alumina can be readily made high. For instance X-ray diffraction can be resorted to in order to verify that the porous alumina is γ-alumina.

The sintering temperature of the alumina precursor can be set for instance to about 400° C. or higher, and ordinarily may be appropriately set to be about 450° C. or higher, preferably about 500° C. or higher and more preferably about 550° C. or higher. Further, the sintering temperature can be appropriately set to be about 800° C. or lower, preferably about 700° C. or lower and more preferably about 650° C. or lower. The technology disclosed herein can be preferably implemented as an embodiment where for instance sintering is carried out at about 500° C. to about 700° C. (more preferably at about 550° C. to about 650° C.).

The sintering time is not particularly limited, and can be set so that there is generated porous alumina having desired properties. Ordinarily, the sintering time is appropriately set to 1 or more hours, and is preferably 2 or more hours and for instance 3 or more hours. The sintering time may be set to 6 or more hours, or 12 or more hours, for instance 24 or more hours. Ordinarily, the sintering time is appropriately set to 72 or fewer hours, preferably 48 or fewer hours and more preferably 50 or fewer hours, from the viewpoint of productivity.

The number of sintering operations in a case where sintering of the metal precursor is carried out divided into a plurality of operations (a plurality of stages, i.e. a plurality of sintering stages) can be set for instance to range from two to five. An embodiment in which sintering is thus carried out divided over a plurality of sintering operations allows obtaining a porous metal oxide of yet higher homogeneity. Ordinarily it is appropriate to prescribe two or three sintering operations (typically two), in terms of productivity.

The plurality of sintering operations herein can be implemented for instance as an embodiment where sintering at the above sintering temperature (for instance sintering at about 300° C. or higher, preferably about 400° C. or higher, more preferably about 500° C. or higher) is divided into N stages being two or more stages.

In a case where sintering is carried out divided into a plurality of sintering operations, once the sintered object (object resulting from a previous sintering stage) is cooled down to a temperature lower than about 300° C. (typically about 100° C. or lower, preferably about 50° C. or lower and more preferably about 40° C. or lower), after any given sintering stage ((n−1)-th sintering stage; herein n denotes an integer in the range from 2 to N), the sintered object can be then subjected to the next sintering stage (n-th stage). The cooled sintered object is preferably subjected to the next sintering stage after having undergone a crushing (pulverizing) operation, as needed. This tends to result in a porous metal oxide of yet higher homogeneity. One preferred example of the above crushing operation involves passing the sintered object through a sieve of appropriate size. As the sieve there can be preferably used a sieve having for instance about 200 mesh to about 30 mesh (typically having sieve openings in the range of about 77 μm to about 600 μm). Although not particularly limited thereto, the above operation can be carried out between a first sintering (first sintering stage) and a second sintering (second sintering stage) in a case where sintering is carried out three or more times. The above operation may be carried out after each sintering stage.

Although not particularly limited thereto, one embodiment of the method for producing a porous metal oxide (for instance porous zirconia, porous alumina or the like) disclosed herein can be realized for instance as an embodiment where there is used substantially no material other than the metal source, the pore forming agent and the aqueous solvent. This can be advantageous for instance from the viewpoint of ease of setting of conditions in the various steps, ease of procurement of the materials used in the production, and enhancing productivity. In the case for instance where materials of different types are used respectively as the metal source and as the pore forming agent, the method for producing a porous metal oxide according to the above embodiment can be realized as an embodiment where there are used only two types of material other than the aqueous solvent.

<Porous Metal Oxide>

The technology disclosed herein provides a porous metal oxide in which the Mo held amount (weight (mg) of Mo atoms held per g of porous metal oxide), as measured in accordance with the method described below, is about 200 mg/g or higher. In a more preferred embodiment, the technology disclosed herein provides a porous metal oxide in which the Mo held amount is about 300 mg/g or higher (typically about 400 mg/g or higher, for instance about 500 mg/g or higher, and further about 600 mg/g or higher). The upper limit of the Mo held amount is not particularly restricted, and can be for instance about 2000 mg/g or lower (typically about 1000 mg/g or lower). The porous metal oxide can be for instance porous alumina (preferably porous γ-alumina), porous zirconia or the like.

[Measurement of the Mo Held Amount]

The lower end of a glass tube having an inner diameter of 2 mm is packed with 0.5 g of a powdery porous metal oxide of each respective example. An aqueous solution of sodium molybdate at a concentration of 30 wt % is prepared, and is poured until the porous metal oxide is immersed in the aqueous solution, within the above glass tube. The whole is then allowed to stand and thereafter the resulting sodium molybdate aqueous solution is retrieved from the lower end of the glass tube. The Mo amount in the sodium molybdate aqueous solution that is supplied to the glass tube and the Mo amount in the sodium molybdate aqueous solution taken from the glass tube are determined by high-frequency inductively coupled plasma-optical emission spectrometry (ICP-OES), and the Mo amount held (supported) on the porous metal oxide is worked out on the basis of the change in the Mo amount. The Mo held amount [mg/g] is calculated by converting the above Mo amount to a numerical value per g of the porous metal oxide that is used. The same method is utilized in the examples described below.

The specific surface area of the porous metal oxide provided in the present description is not particularly limited. The specific surface area of the porous metal oxide can be for instance 4.0 $m^2/g$ or larger, and ordinarily is appropriately 5.0 $m^2/g$ or larger (typically 6.0 $m^2/g$ or larger). In one embodiment, the specific surface area of the porous metal oxide (for instance porous alumina, preferably porous γ-alumina) can be for instance about 180 $m^2/g$ or larger, preferably about 200 $m^2/g$ or larger, more preferably about 220 $m^2/g$ or larger, and yet more preferably about 250 $m^2/g$ or larger. The Mo held amount tends generally to increase accompanying an increase in the specific surface area. In one embodiment the specific surface area of the porous metal oxide may be about 280 $m^2/g$ or larger (for instance about 300 $m^2/g$ or larger). The upper limit of the specific surface area of the porous metal oxide is not particularly restricted.

The specific surface area of the porous metal oxide can be measured in accordance with a nitrogen gas adsorption measurement method (BET method). The same method is utilized in the examples described below.

The average pore size of the porous metal oxide provided in the present description is not particularly limited. The average pore size of the porous metal oxide can be for instance of about 5 nm or larger, typically about 7 nm or larger, and ordinarily about 9 nm or larger, and is preferably about 10 nm or larger (for instance larger than 10 nm), more preferably about 12 nm or larger, and yet more preferably about 15 nm or larger. An increase in average pore size tends to result in enhanced Mo holding performance. In one embodiment the average pore size of the porous metal oxide may be for instance about 18 nm or larger. The average pore size of the porous metal oxide can be for instance about 500 nm or smaller, typically about 300 nm or smaller, ordinarily about 100 nm or smaller, and is preferably about 50 nm or smaller, more preferably about 30 nm or smaller (for instance about 25 nm or smaller). The technology disclosed herein can be suitably utilized in a porous metal oxide having for instance an average pore size of about 5 nm to about 50 nm (about 10 nm to about 25 nm), and in the production of such a porous metal oxide. A porous metal oxide having such an average pore size tends to exhibit good holding performance towards metals such as Mo. Therefore, the porous metal oxide disclosed herein can be preferably utilized for instance in various Mo adsorbents and catalyst carriers. The average pore size of the porous metal oxide can be measured in accordance with a nitrogen gas adsorption measurement. The same method can be utilized in the examples described below. The porous metal oxide can be for instance porous alumina (preferably porous γ-alumina), porous zirconia or the like.

The pore volume of the porous metal oxide provided in the present description is not particularly limited. The pore volume of the porous metal oxide can be for instance 0.010 cm$^3$/g or larger, and ordinarily is appropriately of 0.020 cm$^3$/g or larger. In one embodiment the pore volume of the porous metal oxide (for instance porous alumina, preferably porous γ-alumina) can be for instance about 0.3 cm$^3$/g or larger, and is typically about 0.5 cm$^3$/g or larger, preferably about 0.6 cm$^3$/g or larger, more preferably about 1.0 cm$^3$/g or larger and yet more preferably about 1.1 cm$^3$/g or larger. An increase in pore volume tends to result in enhanced Mo holding performance. In one embodiment the pore volume of the porous metal oxide may be about 1.2 cm$^3$/g or larger. The pore volume of the porous metal oxide can be about 3.0 cm$^3$/g or smaller, typically about 2.5 cm$^3$/g or smaller and for instance about 2.0 cm$^3$/g or smaller. The technology disclosed herein can be preferably utilized in a porous metal oxide having for instance a pore volume in the range of about 0.5 cm$^3$/g to about 2.5 cm$^3$/g (preferably about 0.6 cm$^3$/g to about 2.0 cm$^3$/g), and in the production of such a porous metal oxide. A porous metal oxide having such a pore volume tends to exhibit good holding performance towards metals such as Mo. Therefore, the porous metal oxide can be preferably utilized for instance in various Mo adsorbents and catalyst carriers. The pore volume of the porous metal oxide can be measured in accordance with a nitrogen gas adsorption measurement. The same method is utilized in the examples described below.

The technology disclosed herein allows providing a porous metal oxide (for instance porous alumina) of high Mo held amount per surface area (weight (mg) of Mo atoms held per m$^2$ of surface area of the porous metal oxide). For instance there can be provided a porous metal oxide having a Mo held amount, per surface area, of about 0.9 mg/m$^2$ or greater. The upper limit of the Mo held amount per surface area is not particularly restricted, and can be for instance of about 10 mg/m$^2$ or smaller.

The present description provides for instance a porous metal oxide (for instance porous alumina) having a pore volume of 0.3 cm$^3$/g or larger and an average pore size of 9 nm or larger. Particularly preferred is a porous metal oxide that satisfies the above pore volume and average pore size, and has a specific surface area of 180 m$^2$/g or larger.

A porous metal oxide having such a structure tends to exhibit good holding performance towards metals (the term encompasses single metals as well as alloys and metal compounds). Therefore, the technology disclosed herein can be preferably utilized for instance in various catalyst carriers and metal adsorbents. For instance porous alumina having such a structure tends to exhibit excellent holding performance towards Mo, and accordingly is suitably used in Mo adsorbents and the like. The method for producing a porous metal oxide disclosed herein can be suitably utilized as a method for producing a porous metal oxide that satisfies the above pore volume and average pore size (preferably a porous metal oxide that satisfies also the above specific surface area).

The outer form of the porous metal oxide is not particularly limited, and the porous metal oxide can be prepared to an appropriate outer form in accordance with the intended application and manner of use. In a preferred embodiment of the technology disclosed herein for instance the porous metal oxide can be prepared in the form of particles having an average particle size of about 1 μm to about 400 μm (more preferably about 10 μm to about 300 μm). For instance the porous metal oxide can be prepared so as to contain substantially no particles having a diameter exceeding about 500 μm.

<Uses>

The metal oxide provided in the technology disclosed herein can be preferably used in various fields.

For instance the porous alumina provided in the technology disclosed herein can be preferably used in Mo adsorbents of $^{99m}$Tc generators. The technology disclosed herein can be preferably used for producing porous alumina for such applications. Therefore, the matter provided in the present description encompasses porous alumina produced in accordance with any one of the methods disclosed herein, a $^{99m}$Tc generator provided with an Mo adsorbent in the form of any of the porous alumina disclosed herein (which can be porous alumina produced in accordance with any one of the methods disclosed herein; likewise hereafter), porous alumina for the above Mo adsorbent, and a method for producing a $^{99m}$Tc generator using any one of the porous alumina disclosed herein.

The $^{99m}$Tc generator can be configured in the same way as a conventional $^{99m}$Tc generator, except for the feature of using any one of the porous alumina disclosed herein as a Mo adsorbent. An outline of a configuration example of such a $^{99m}$Tc generator will be explained with reference to FIG. 2.

Figure 2:
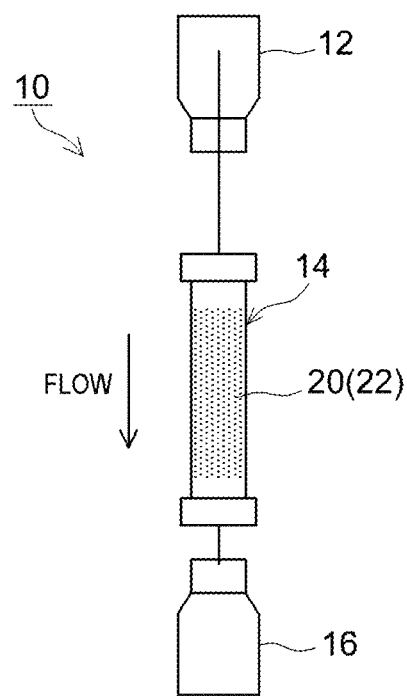
FIG. 2 is a schematic diagram illustrating the schematic configuration of a $^{99m}$Tc generator.

The $^{99m}$Tc generator 10 illustrated in FIG. 2 is provided with a column 14 that holds $^{99}$Mo-adsorbed alumina 20, a physiological saline vessel 12 connected to the upstream side of the column 14, and a $^{99m}$Tc solution recovery vessel 16 connected to the downstream side of the column 14. The periphery of at least the column 14 in the $^{99m}$Tc generator 10 is covered by a shield not shown (typically a shield made of lead).

In the $^{99}$Mo-adsorbed alumina 20 within the column 14, $^{99}$Mo is caused to adsorb on any of the porous alumina 22 disclosed herein, before or after accommodation of the porous alumina 22 in the column 14. For instance, the column 14 is packed with porous alumina 22, and thereafter an aqueous solution containing ($^{99}$Mo)O$_4^{2-}$ is supplied to the column 14, to thereby allow $^{99}$Mo to adsorb onto the porous alumina 22. The adsorbed $^{99}$Mo decays thereupon, emitting β rays, into $^{99m}$Tc.

Physiological saline supplied from the physiological saline vessel 12 washes through the column 14, and the generated $^{99m}$Tc is eluted as a result in the form of $^{99m}$TcO$_4^-$ which is recovered, in the $^{99m}$Tc solution recovery vessel 16, for being used for instance to produce a radiopharmaceutical (technetium preparation).

The porous alumina provided in the technology disclosed herein is not limited to Mo adsorbents such as the above, and can be preferably used also in applications where the porous alumina is used as some other adsorbent or catalyst carrier, similarly to ordinary porous metal oxides.

Also porous metal oxides other than the porous alumina provided in the technology disclosed herein can be preferably used as metal adsorbents (for instance Mo adsorbents), and also in applications where the porous metal oxide is used as some other adsorbent or catalyst carrier, similarly to ordinary porous metal oxides.

EXAMPLES

Various examples of the present invention will be explained next. However, the present invention is not meant to be limited to the matter illustrated in such concrete examples.

Production of Porous Alumina

Example 1

Herein 970 g of distilled water were charged in a glass beaker, at room temperature, and 30 g of ammonium carbonate as a pore forming agent were likewise charged and were dissolved while under stirring using a magnetic stirrer. Then 32 g of powdery aluminum isopropoxide were added to the aqueous solution of ammonium carbonate, and the whole was continuously stirred at room temperature for 24 hours, to prepare a slurry. A product prepared by triturating a commercially available product down to an average particle size of about 100 μm, with a mortar, was used as the aluminum isopropoxide.

Next, the slurry (content of the beaker) was transferred to a heat resistant tray made of a silicone resin, and the whole was allowed to stand within a drier at 80° C., to be dried for 48 hours.

Thereafter, an alumina precursor (dried product of the slurry) on the heat resistant tray was transferred to a sagger and was sintered in a furnace in the atmosphere. Specifically, a first sintering stage of heating for 6 hours at 600° C. was carried out first; then the product was taken out of the furnace, was cooled down to room temperature, and was passed through a 50-mesh wire mesh, to thereby render the particle size homogeneous to a certain extent. Thereafter, the product was returned to the furnace, and a second sintering stage of heating at 600° C. for further 24 hours was carried out. The product was then left to cool down to room temperature and was passed again through a 50-mesh wire mesh, to yield porous alumina according to Example 1.

Examples 2 and 3

Porous alumina according to Examples 2 and 3 was obtained in the same way as in Example 1, but herein the amount of ammonium carbonate was modified to 60 g (Example 2) and to 90 g (Example 3), respectively.

Example 4

Herein 30 g of glucose as a pore forming agent were used instead of 30 g of ammonium carbonate as the pore forming agent in Example 1. Aluminum isopropoxide was added to an aqueous solution of glucose, after which the pH was adjusted to 5.0 using $HNO_3$, followed by stirring for 24 hours at room temperature, to prepare a slurry. Otherwise porous alumina according to Example 4 was obtained in the same way as in Example 1.

Example 5

Production of porous alumina was attempted using aluminum nitrate, instead of aluminum isopropoxide, in Example 2. However, rapid gelling occurred halfway during start of addition of an aqueous solution of aluminum nitrate to the aqueous solution of ammonium carbonate, and stirring was discontinued. As a result it was found that obtaining a homogeneous slurry was difficult, and the experiment after that was discontinued.

Example 6

Herein there was used porous alumina (Aluminum Oxide, type number 199966) available from Sigma Aldrich USA.

(Evaluation)

Figure 3:
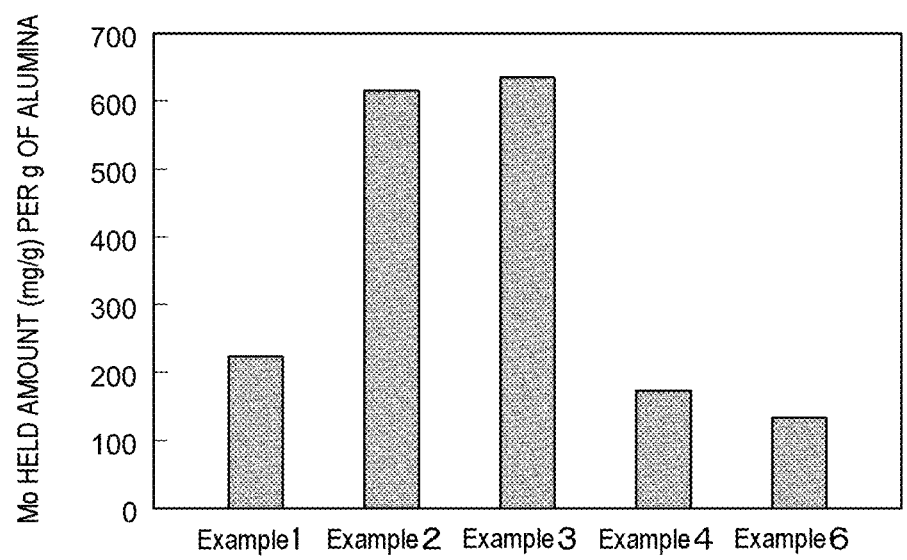
FIG. 3 is a characteristic diagram illustrating Mo adsorption amount in porous alumina produced in Examples 1 to 4 and 6.

The specific surface area, pore volume and average pore size of the porous alumina of Examples 1 to 4 and 6 were measured in accordance with the above methods. The results are given in Table 1. The molybdenum held amount per weight of porous alumina was measured in accordance with the method described above. The results are given in Table 1 and are illustrated in FIG. 3.

TABLE 1

|  |  | Example 1 | Example 2 | Example 3 | Example 4 | Example 5 | Example 6 |
| --- | --- | --- | --- | --- | --- | --- | --- |
| Distilled water | Amount (parts by weight) | 970 | 970 | 970 | 970 | 970 | Existing products |
| Pore forming agent | Type | Ammonium carbonate | Ammonium carbonate | Ammonium carbonate | Glucose | Ammonium carbonate |  |
|  | Amount (parts by weight) | 30 | 60 | 90 | 30 | 60 |  |
| Aluminum isopropoxide | Amount (parts by weight) | 32 | 32 | 32 | 32 | (Ammonium nitrate (32)) |  |
| Amount of pore forming agent (parts by weight) per 100 parts by weight of aluminum isopropoxide |  | 94 | 188 | 281 | 94 | — |  |
| Specific surface area (m²/g) |  | 223.5 | 264.8 | 308.1 | 263.6 | — | 154.2 |
| Pore volume (cm³/g) |  | 0.614 | 1.153 | 1.293 | 0.584 | — | 0.254 |
| Average pore size (nm) |  | 9.6 | 16.6 | 19.4 | 8.3 | — | 6.0 |
| Mo held amount (mg/g) per g of alumina |  | 223 | 615 | 635 | 173 | — | 133 |

As Table 1 reveals, the porous alumina of Examples 1 to 3 produced using ammonium carbonate exhibited a greater molybdenum held amount per weight of alumina than that of the porous alumina of Example 4, produced using glucose, and than that of a commercially available porous alumina (Example 6). Among the foregoing the porous alumina in Examples 2 and 3 exhibited excellent Mo adsorptivity, being 4.5 or more times that of Example 6.

Porous alumina was produced in the same way as in Example 2, but using herein sodium bicarbonate instead of ammonium carbonate, with measurements and evaluation being carried out in the same way as in Example 2. The specific surface area was 3.9 g/m², the pore volume was 0.06 cm³/g, the average pore size was 62.9 nm and the Mo held amount per weight was 412 mg/g.

Production of Porous Zirconia

Example 7

Figure 4:
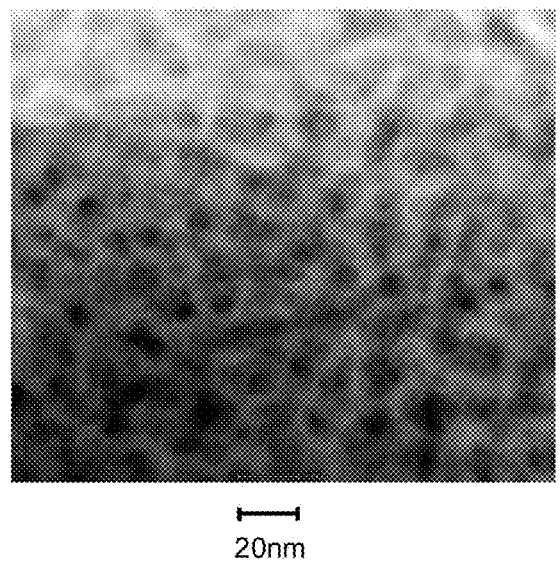
FIG. 4 is a TEM image of porous zirconia produced in Example 7.

Herein 300 g of distilled water were charged in a glass beaker, at room temperature, and 60 g of ammonium carbonate as a pore forming agent were likewise charged and were dissolved while under stirring using a magnetic stirrer. Further, a solution B containing 32 g of zirconium tetraisopropoxide in 50 mL of methanol was added to the resulting aqueous solution (solution A) of ammonium carbonate, with continued stirring for 24 hours at room temperature, to thereby prepare a slurry. Next, the slurry (content of the beaker) was transferred to a heat resistant tray made of a silicone resin, and was dried at room temperature. Thereafter, the resulting zirconia precursor (dried product of the slurry) in the heat resistant tray was transferred to a sagger, and was sintered for 6 hours at 600° C. in a furnace in the atmosphere. The sintered product was then left to cool down to room temperature, and was passed through a 50-mesh wire mesh, to yield porous zirconia according to Example 7. FIG. 4 illustrates a TEM (transmission electronic microscopy) image of the obtained porous zirconia. The properties of the porous zirconia were evaluated in the same way as those of the porous alumina described above. The specific surface area was 8.5 m$^3$/g, the pore volume was 0.027 cm$^3$/g and the average pore size was 11.1 nm.

Example 8

Figure 5:
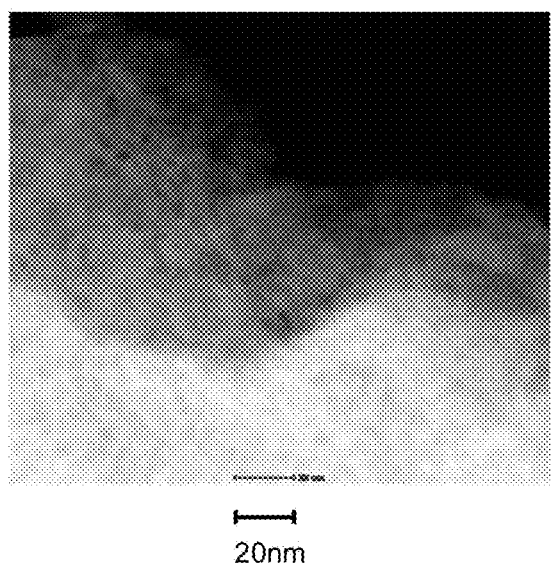
FIG. 5 is a TEM image of porous zirconia produced in Example 8.

Porous zirconia according to Example 8 was obtained in the same way as in Example 7, but modifying herein the sintering conditions of the zirconia precursor to 6 hours at 200° C. FIG. 5 illustrates a TEM image of the obtained porous zirconia. The specific surface of this porous zirconia was 66.9 m$^3$/g, the pore volume was 0.062 cm$^3$/g and the average pore size was 2.3 nm.

These examples revealed that when obtaining porous zirconia through sintering of a zirconia precursor containing a pore forming agent, the properties of the obtained porous zirconia (for instance average pore size) can be adjusted by modifying the sintering conditions (sintering temperature) of the precursor.

Concrete examples of the present invention have been explained in detail above, but the examples are illustrative in nature, and are not meant to limit the scope of the claims in any way. The technology set forth in the claims encompasses various alterations and modifications of the concrete examples illustrated above.

REFERENCE SIGNS LIST

10 $^{99m}$Tc generator
12 Physiological saline vessel
14 Column
16 $^{99m}$Tc solution recovery vessel
20 $^{99}$Mo-adsorbed metal oxide
22 Porous alumina (Mo adsorbent)

The invention claimed is:

1. A method for producing a porous metal oxide, the method comprising:
    preparing a slurry by mixing a metal source, a pore forming agent, and an aqueous solvent, wherein the aqueous solvent is water and the slurry is prepared using 1 part by weight to 50 parts by weight of the metal source, with respect to 100 parts by weight of the aqueous solvent;
    drying the slurry to obtain a metal oxide precursor; and
    sintering the metal oxide precursor to generate a porous metal oxide, wherein
    the metal source is an organometallic compound or hydrolyzate thereof containing a metal that makes up the porous metal oxide;
    the pore forming agent is an inorganic compound that generates a gas by decomposing at a temperature equal to or lower than the temperature at which the metal oxide precursor is sintered; and
    the slurry is prepared using 50 parts by weight or more of the pore forming agent with respect to 100 parts by weight of the metal source.

2. The method according to claim 1, wherein the organometallic compound is a metal alkoxide.

3. The method according to claim 2, wherein the metal alkoxide includes at least one alkoxide selected from the group consisting of aluminum alkoxides, zirconium alkoxides and titanium alkoxides.

4. The method according to claim 1, wherein the pore forming agent includes at least one compound selected from the group consisting of ammonium salts, carbonate salts and bicarbonate salts.

5. The method according claim 1, wherein the slurry is prepared using 2 parts by weight to 30 parts by weight of the pore forming agent with respect to 100 parts by weight of the aqueous solvent.

6. The method according to claim 1, wherein the metal oxide precursor is sintered at a sintering temperature in a range of 500° C. to 700° C.

7. The method according to claim 1, wherein
    sintering of the metal oxide precursor includes N sintering stages from a first stage up to an N-th stage, in this order, where N is an integer equal to or greater than 2; and
    a sintered product from an (n−1)-th stage (where n is an integer from 2 to N), from among the N sintering stages, is subjected to a n-th sintering stage after having been cooled down to a temperature lower than 300° C.

8. The method according to claim 1, wherein the metal oxide precursor is sintered so as to generate the porous metal oxide having an average pore size of 9 nm or larger.

9. The method according to claim 1, wherein the metal oxide precursor is sintered so as to generate the porous metal oxide having a pore volume of 0.3 cm$^3$/g or larger.

10. The method according to claim 1, wherein the metal oxide precursor is sintered so as to generate the porous metal oxide having a specific surface area of 180 m$^2$/g or larger.

11. The method according to claim 1, wherein the porous metal oxide is porous alumina.

12. The method according to claim 1, wherein the porous metal oxide is porous zirconia.

13. The method according to claim 8, wherein the porous metal oxide is used as a Mo adsorbent, and it has a Mo held amount of 300 mg/g or greater.

14. The method according to claim 1, wherein the preparing is performed by mixing the metal source, the pore forming agent, and the aqueous solvent at a temperature lower than 40° C.

15. The method according to claim 1, wherein the metal oxide precursor is obtained from the slurry without the need of an operation of separating a solid contained in the slurry from the aqueous solvent or an operation of washing the solid.

* * * * *